US010536746B2

(12) United States Patent
Seo et al.

(10) Patent No.: US 10,536,746 B2
(45) Date of Patent: *Jan. 14, 2020

(54) MEDIA CHANNEL IDENTIFICATION WITH MULTI-MATCH DETECTION AND DISAMBIGUATION BASED ON LOCATION

(71) Applicant: Gracenote, Inc., Emeryville, CA (US)

(72) Inventors: Chung Won Seo, Seoul (KR);
Youngmoo Kwon, Goyang (KR);
Jaehyung Lee, Seoul (KR)

(73) Assignee: Gracenote, Inc., Emeryville, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/274,975

(22) Filed: Feb. 13, 2019

(65) Prior Publication Data
US 2019/0182539 A1 Jun. 13, 2019

Related U.S. Application Data

(63) Continuation of application No. 16/017,218, filed on Jun. 25, 2018, which is a continuation of application
(Continued)

(51) Int. Cl.
H04H 60/32 (2008.01)
H04N 21/44 (2011.01)
(Continued)

(52) U.S. Cl.
CPC ...... H04N 21/44008 (2013.01); H04H 60/31 (2013.01); H04H 60/43 (2013.01);
(Continued)

(58) Field of Classification Search
CPC ....... H04N 21/44008; H04N 21/23418; H04N 21/2353; H04N 21/2407; H04N 21/25841;
(Continued)

(56) References Cited

U.S. PATENT DOCUMENTS 7,461,392 B2 12/2008 Herley
7,653,921 B2 1/2010 Herley
(Continued)

FOREIGN PATENT DOCUMENTS

CN 102176208 9/2011
CN 103501449 1/2014
(Continued)

OTHER PUBLICATIONS

US 9,189,826 B1, 11/2015, Sharifi et al. (withdrawn)
(Continued)

Primary Examiner — Mulugeta Mengesha
(74) Attorney, Agent, or Firm — McDonnell Boehnen Hulbert & Berghoff LLP

(57) ABSTRACT

Disclosed are methods and systems involving location-based disambiguation of media channel identification, in a scenario where a fingerprint of media content being rendered by a media presentation device matches multiple reference fingerprints corresponding respectively with multiple different media channels. Upon detecting such a multi-match situation, a server or other entity will use a location of the media presentation device as a basis to disambiguate between the matching reference fingerprints and thus to determine the channel on which the media content being rendered by the media presentation device is arriving.

20 Claims, 6 Drawing Sheets

Related U.S. Application Data

No. 15/842,206, filed on Dec. 14, 2017, now Pat. No. 10,057,638, which is a continuation of application No. 15/179,143, filed on Jun. 10, 2016, now Pat. No. 9,924,222.

(60) Provisional application No. 62/301,616, filed on Feb. 29, 2016.

(51) Int. Cl.

| | |
|---|---|
| *H04N 21/442* | (2011.01) |
| *H04N 21/435* | (2011.01) |
| *H04N 21/475* | (2011.01) |
| *H04N 21/438* | (2011.01) |
| *H04N 21/61* | (2011.01) |
| *H04N 21/234* | (2011.01) |
| *H04N 21/235* | (2011.01) |
| *H04N 21/24* | (2011.01) |
| *H04N 21/258* | (2011.01) |
| *H04N 21/6543* | (2011.01) |
| *H04N 21/81* | (2011.01) |
| *H04N 21/8358* | (2011.01) |
| *H04N 21/431* | (2011.01) |
| *H04N 21/84* | (2011.01) |
| *H04N 21/845* | (2011.01) |
| *H04N 21/231* | (2011.01) |
| *H04N 21/658* | (2011.01) |
| *H04N 21/8352* | (2011.01) |
| *H04H 60/31* | (2008.01) |
| *H04H 60/43* | (2008.01) |
| *H04H 60/56* | (2008.01) |
| *H04H 60/65* | (2008.01) |

(52) U.S. Cl.
CPC ... *H04N 21/2353* (2013.01); *H04N 21/23109* (2013.01); *H04N 21/23418* (2013.01); *H04N 21/2407* (2013.01); *H04N 21/25841* (2013.01); *H04N 21/431* (2013.01); *H04N 21/435* (2013.01); *H04N 21/4383* (2013.01); *H04N 21/44204* (2013.01); *H04N 21/44222* (2013.01); *H04N 21/4756* (2013.01); *H04N 21/6118* (2013.01); *H04N 21/6543* (2013.01); *H04N 21/6582* (2013.01); *H04N 21/812* (2013.01); *H04N 21/8352* (2013.01); *H04N 21/8358* (2013.01); *H04N 21/84* (2013.01); *H04N 21/8456* (2013.01); *H04H 60/56* (2013.01); *H04H 60/65* (2013.01); *H04H 2201/90* (2013.01)

(58) Field of Classification Search
CPC .............. H04N 21/431; H04N 21/435; H04N 21/4383; H04N 21/44204; H04N 21/44222; H04N 21/4756; H04N 21/6118; H04N 21/6543; H04N 21/812; H04N 21/8358; H04N 21/84; H04N 21/8456
See application file for complete search history.

(56) References Cited

U.S. PATENT DOCUMENTS

| | | | |
|---|---|---|---|
| 7,788,696 B2 | 8/2010 | Burges et al. | |
| 7,797,249 B2 | 9/2010 | Schmeizer et al. | |
| 7,917,645 B2 | 3/2011 | Ikezoye et al. | |
| 8,150,096 B2 | 4/2012 | Alattar | |
| 8,185,733 B2 | 5/2012 | Schwartz et al. | |
| 8,510,770 B1 | 8/2013 | Oztaskent et al. | |
| 8,649,659 B2 | 2/2014 | Lalwaney | |
| 8,700,194 B2 | 4/2014 | Bauer et al. | |
| 9,094,715 B2 | 7/2015 | Neumeier et al. | |
| 9,203,538 B2 | 12/2015 | Anniballi et al. | |
| 9,240,851 B2 | 1/2016 | Park | |
| 9,275,427 B1* | 3/2016 | Sharifi ................ G06T 1/0021 | |
| 9,412,330 B2 | 8/2016 | Keating et al. | |
| 9,465,995 B2 | 10/2016 | Harron et al. | |
| 9,609,391 B2 | 3/2017 | Oztaskent et al. | |
| 9,635,417 B2 | 4/2017 | Grant et al. | |
| 9,704,016 B2 | 7/2017 | Jang et al. | |
| 9,706,261 B2 | 7/2017 | Chen | |
| 9,906,843 B2 | 2/2018 | Yabu et al. | |
| 9,967,613 B2 | 5/2018 | Kitazato | |
| 9,986,306 B2 | 5/2018 | Nagorski et al. | |
| 9,992,527 B2 | 6/2018 | An et al. | |
| 10,200,765 B2 | 2/2019 | Yabu | |
| 2002/0083060 A1 | 6/2002 | Wang et al. | |
| 2003/0046437 A1 | 3/2003 | Eytchison et al. | |
| 2003/0063217 A1 | 4/2003 | Smith | |
| 2004/0143349 A1 | 7/2004 | Roberts et al. | |
| 2004/0189873 A1 | 9/2004 | Konig et al. | |
| 2005/0144455 A1 | 6/2005 | Haitsma | |
| 2005/0149968 A1 | 7/2005 | Konig et al. | |
| 2006/0062426 A1 | 3/2006 | Levy et al. | |
| 2006/0182412 A1 | 8/2006 | Lefevre | |
| 2007/0055500 A1 | 3/2007 | Bilobrov | |
| 2007/0124756 A1 | 5/2007 | Covell et al. | |
| 2007/0143777 A1 | 6/2007 | Wang | |
| 2007/0192782 A1 | 8/2007 | Ramaswamy | |
| 2007/0217648 A1 | 9/2007 | Muehlbauer | |
| 2008/0060036 A1 | 3/2008 | Cox | |
| 2008/0082510 A1 | 4/2008 | Wang et al. | |
| 2010/0131970 A1 | 5/2010 | Falcon | |
| 2010/0293568 A1 | 11/2010 | Jarman | |
| 2010/0318587 A1 | 12/2010 | Seet et al. | |
| 2010/0329547 A1 | 12/2010 | Cavet | |
| 2011/0075851 A1 | 3/2011 | LeBoeuf et al. | |
| 2011/0173208 A1 | 7/2011 | Vogel | |
| 2011/0273455 A1 | 11/2011 | Powar et al. | |
| 2011/0289098 A1 | 11/2011 | Oztaskent et al. | |
| 2011/0313856 A1 | 12/2011 | Cohen et al. | |
| 2012/0089911 A1 | 4/2012 | Hosking et al. | |
| 2012/0117584 A1 | 5/2012 | Gordon | |
| 2012/0167140 A1 | 6/2012 | Park et al. | |
| 2012/0239175 A1 | 9/2012 | Mohajer et al. | |
| 2013/0011008 A1 | 1/2013 | Ikezoye et al. | |
| 2013/0052939 A1 | 2/2013 | Anniballi et al. | |
| 2013/0054645 A1 | 2/2013 | Bhagavathy et al. | |
| 2013/0081097 A1 | 3/2013 | Park et al. | |
| 2013/0145414 A1 | 6/2013 | Yamagishi | |
| 2013/0152139 A1 | 6/2013 | Davis et al. | |
| 2013/0205330 A1 | 8/2013 | Sinha et al. | |
| 2013/0212609 A1 | 8/2013 | Sinha et al. | |
| 2013/0254793 A1 | 9/2013 | Anniballi et al. | |
| 2013/0308818 A1 | 11/2013 | MacIntosh et al. | |
| 2013/0326573 A1 | 12/2013 | Sharon et al. | |
| 2013/0345840 A1 | 12/2013 | Lempel et al. | |
| 2014/0007152 A1 | 1/2014 | Pora et al. | |
| 2014/0013352 A1 | 1/2014 | Shavit et al. | |
| 2014/0059587 A1 | 2/2014 | Davis et al. | |
| 2014/0082655 A1 | 3/2014 | Moon et al. | |
| 2014/0089307 A1 | 3/2014 | Garside et al. | |
| 2014/0115627 A1 | 4/2014 | Lee et al. | |
| 2014/0193027 A1 | 7/2014 | Scherf et al. | |
| 2014/0196077 A1* | 7/2014 | Gordon .............. H04N 21/8358 725/31 |
| 2014/0236988 A1 | 8/2014 | Harron et al. | |
| 2014/0282662 A1 | 9/2014 | Major | |
| 2014/0282693 A1 | 9/2014 | Soundararajan et al. | |
| 2014/0325555 A1 | 10/2014 | Khader et al. | |
| 2014/0337874 A1 | 11/2014 | Kitazato | |
| 2015/0020094 A1 | 1/2015 | Moon et al. | |
| 2015/0033500 A1 | 2/2015 | Block et al. | |
| 2015/0089526 A1 | 3/2015 | Gordon | |
| 2015/0106839 A1 | 4/2015 | Shrum, Jr. et al. | |
| 2015/0120839 A1 | 4/2015 | Kannan et al. | |
| 2015/0181263 A1 | 6/2015 | Gordon et al. | |
| 2015/0237409 A1 | 8/2015 | Harper et al. | |
| 2015/0302086 A1 | 10/2015 | Roberts | |

(56) References Cited

U.S. PATENT DOCUMENTS

| | | |
|---|---|---|
| 2015/0365709 A1 | 12/2015 | Cho et al. |
| 2016/0094877 A1* | 3/2016 | Heffernan ........ H04N 21/44008 725/19 |
| 2016/0127398 A1 | 5/2016 | Cohen |
| 2016/0275588 A1 | 9/2016 | Ye et al. |
| 2016/0316261 A1 | 10/2016 | Koshevoy |
| 2017/0048566 A1 | 2/2017 | Srinivasan |
| 2017/0308556 A1 | 10/2017 | Gonzales-Brenes, Jr. et al. |
| 2017/0330474 A1 | 11/2017 | Rho et al. |

FOREIGN PATENT DOCUMENTS

| | | |
|---|---|---|
| CN | 103581705 | 2/2014 |
| EP | 2 763 427 | 11/2011 |
| EP | 2 704 444 | 3/2014 |
| EP | 3 179 409 | 6/2017 |
| EP | 3 396 562 | 10/2018 |
| JP | 2001298433 | 10/2001 |
| JP | 2011217144 | 10/2011 |
| JP | 2012156643 | 8/2012 |
| JP | 2015008508 | 1/2015 |
| KR | 20130124911 | 11/2013 |
| WO | WO 2005/079499 | 9/2005 |
| WO | WO 2008/042953 | 4/2008 |
| WO | WO 2014/004914 | 1/2014 |

OTHER PUBLICATIONS

Office Action from U.S. Appl. No. 15/443,580, dated Dec. 14, 2017.
Office Action from U.S. Appl. No. 15/443,580, dated May 21, 2018.
Office Action from U.S. Appl. No. 16/015,811, dated Aug. 23, 2018.
International Preliminary Report on Patentability from International Application No. PCT/US2017/019915, dated Sep. 4, 2018.

* cited by examiner

US 10,536,746 B2

MEDIA CHANNEL IDENTIFICATION WITH MULTI-MATCH DETECTION AND DISAMBIGUATION BASED ON LOCATION

REFERENCE TO RELATED APPLICATIONS

This is a continuation of U.S. patent application Ser. No. 16/017,218, filed Jun. 25, 2018, which is a continuation of U.S. patent application Ser. No. 15/842,206, filed Dec. 14, 2017, which issued as U.S. Pat. No. 10,057,638 and is a continuation of U.S. patent application Ser. No. 15/179,143, filed Jun. 10, 2016, which issued as U.S. Pat. No. 9,924,222 and claims priority to U.S. Provisional Patent Application No. 62/301,616. Each of these priority applications is hereby incorporated by reference in its entirety. In addition, the disclosure of U.S. Patent Application Pub. No. 2015/0181263 is hereby incorporated by reference in its entirety.

BACKGROUND

A typical media presentation device operates to receive an analog or digital media stream representing media content such as video and/or audio content and to render and present the media content on a user interface such as a display screen and/or an audio speaker. Examples of such devices include, without limitation, televisions, computer monitors, projection systems, loudspeakers, headphones, and the like.

In many cases, such a media presentation device may be in communication with a receiver, such as a local set top box or other similar device or a remote server, that has access to numerous discrete channels of media content and that can selectively deliver a given such channel's media content to the media presentation device for playout.

By way of example, a television may be communicatively linked with a cable-TV set top box that has access to a set of cable-TV channels, and the set top box may be configured to receive user input selecting a particular channel and to responsively tune to the selected channel and output to the television the media content of the selected channel, for presentation of the media content to a user. As another example, a loudspeaker may be communicatively linked with a radio that has access to a set of radio stations, and the radio may be configured to receive user input selecting a particular channel (station) and to responsively tune to the selected channel and output to the loudspeaker the media content of the selected channel, for presentation of the media content to a user. And as still another example, a media presentation device such as a display or speaker may be communicatively linked with a computer that has access to a myriad of online streaming media channels, and the computer may be configured to receive user input selecting a particular channel and to responsively initiate receipt and output of the selected media content and provide the media content to the display and/or speaker for presentation to a user.

SUMMARY

When a media presentation device receives and renders media content, the media presentation device may not have an indication of which channel carried the media content. A receiver or other device that selectively tunes to the channel and receives the media content and that provides the media content to the media presentation device may have such information, but the media presentation device that receives the media content from that other device may not have such information. For example, if a television is coupled with a cable-TV set top box and a user selects a particular cable channel on the set top box, the set top box may thereby have an indication of the selected channel as the channel on which the set top box is then receiving a media content that is being output to the television. But the television itself may merely receive and render the media content and may have no indication of the selected channel.

For various reasons, however, it may be useful to determine which of various channels is the channel that carries the content being rendered by a media presentation device. Further, it may be useful to do so without receiving from a channel-selection device (e.g., receiver or remote control) a report of the channel to which that device is tuned, and perhaps without any involvement of the channel-selection device. For instance, it may be useful for the media presentation device itself, and/or a network server working in cooperation with the media presentation device, to determine the channel based on an evaluation of the media content that is being rendered by the media presentation device. Given knowledge of the channel on which the media content is arriving, the media presentation device, the network server, and/or another entity could then carry out one or more operations keyed to the channel, such as determining and recording an extent to which media content of that channel is being played, selectively replacing a predetermined portion of the media content with alternative content (such as a replacement advertisement), or superimposing channel-specific content over the media content for presentation along with the media content, among numerous other possibilities.

One method to determine the channel on which media content is arriving is to have the media presentation device (or perhaps an adjunct device) and/or a network server generate a digital fingerprint of the media content that is being rendered by the media presentation device, and to then compare that fingerprint with reference fingerprint data established for media content known to be provided on particular channels.

For example, a network server or other such entity may establish or otherwise have access to reference data that includes a reference fingerprint of each of the channels available to provide media content to the media presentation device (e.g., each of the channels within a subscription plan for a set-top box that supplies media content to the media presentation device) and that maps each reference fingerprint to the channel on which the media content is provided. As the media presentation device receives and renders given media content, the media presentation device may then generate a fingerprint of that media content and, through a network communication interface, report the generated fingerprint to the network server for analysis. The network server may then compare the reported fingerprint with the reference fingerprint data to find a match with a reference fingerprint and to thereby determine that the channel on which the media content is arriving is the channel that the reference data maps with that reference fingerprint. Upon thereby determining the channel on which the media content is arriving, the network server may then communicate an indication of the channel to the media presentation device, and the media presentation device may take channel-specific action. Alternatively, the network server itself or another entity may take channel-specific action based on the determined channel.

Unfortunately, however, a problem that can arise in this process is that the same media content may be provided on multiple different channels, whether concurrently or at different times, and so a fingerprint of media content being rendered by a media presentation device may not correlate with just the channel on which the media content is arriving. For example, a sports game or political event might be broadcast concurrently on multiple different channels, or a syndicated television or radio show might be broadcast on multiple different such channels concurrently or at different times. In these or other scenarios, if the media presentation device is presenting such media content and generates and provides a fingerprint of the media content, that fingerprint could be mapped to multiple reference fingerprints, and consequently the channel-identification would be inconclusive.

As a specific example of this, consider a scenario where two different video content providers both broadcast the same sports game, each on a separate respective channel, and where an advertiser has a contract with just one of the content providers to present a pop-up advertisement on that provider's broadcast of the game. In this scenario, when a media presentation device is receiving and presenting one of these broadcasts, if the media presentation device generates and provides to the network server a fingerprint of the broadcast, the network server may determine that the fingerprint matches both content providers' broadcasts of the game, and so it would be unclear whether the media presentation device should present the pop-up advertisement or not.

Disclosed herein are methods and systems to help disambiguate channel identification in a scenario where fingerprint data of media content matches multiple reference fingerprints corresponding respectively with multiple different channels. In accordance with the disclosure, a network server or other entity carrying out this analysis will detect a multi-match scenario by determining that the fingerprint of the media content at issue matches two or more reference fingerprints corresponding respectively with different channels. Faced with the detected multi-match scenario, the entity will then use context information regarding the media content being rendered by the media presentation device as a basis to disambiguate the channel identity so as to determine which of the channels the media content being rendered by the media presentation device is arriving on, so as to facilitate taking channel-specific action.

One example of such context information is location of the media presentation device. In particular, it may be the case that the same media content is being provided or scheduled to be provided in multiple different locations, such as multiple different geographic market areas (e.g., different metropolitan areas or the like), on a respective channel in each location. To address that situation, each of two or more reference fingerprints in a multi-match scenario could be associated with a respective location, and knowledge of location of the media presentation device that is rendering the media content could then be used as a basis to disambiguate between the two or more matching reference fingerprints and thus to determine the channel on which the media content being rendered by the media presentation device is arriving.

Accordingly, in one respect, disclosed is a method that involves taking action based on a channel determined through location-based disambiguation. The method includes a computing system determining that a fingerprint of media content being rendered by a media presentation device matches multiple reference fingerprints each corresponding with a different respective channel. Further, the method includes, responsive to determining that the fingerprint matches the multiple reference fingerprints each corresponding with a different respective channel, performing disambiguation based at least in part on location of the media presentation device, to determine which channel the media presentation device is receiving the media content on. And the method then includes taking action based on the determined channel.

Further, in another respect, disclosed is a non-transitory computer readable medium having stored thereon instructions executable by a processing unit to carry out various operations. The operations include determining that a fingerprint of media content being rendered by a media presentation device matches multiple reference fingerprints each corresponding with a different respective channel. Further, the operations include, responsive to determining that the fingerprint matches the multiple reference fingerprints each corresponding with a different respective channel, performing disambiguation based at least in part on location of the media presentation device, to determine which channel carrying the media content being rendered by the media presentation device. And the operations include taking action based on the determined channel.

In addition, in another respect, disclosed is a system including a network communication interface, a processing unit, non-transitory data storage, and program instructions stored in (e.g., on) the non-transitory data storage and executable by the processing unit to carry out various operations. The operations include receiving from a media presentation device, via the network communication interface, a fingerprint of media content being rendered by the media presentation device. Further, the operations include determining that the received fingerprint matches multiple reference fingerprints each corresponding with a different respective channel. And the operations include, responsive to determining that the received fingerprint matches the multiple reference fingerprints each corresponding with a different respective channel, performing disambiguation based at least in part on a location of the media presentation device, to determine which channel carries the media content being rendered by the media presentation device. The operations then include taking action based on the determined channel.

These as well as other aspects, advantages, and alternatives will become apparent to those of ordinary skill in the art by reading the following detailed description, with reference where appropriate to the accompanying drawings. Further, it should be understood that the descriptions provided in this summary and below are intended to illustrate the invention by way of example only and not by way of limitation.

DETAILED DESCRIPTION

Figure 1:
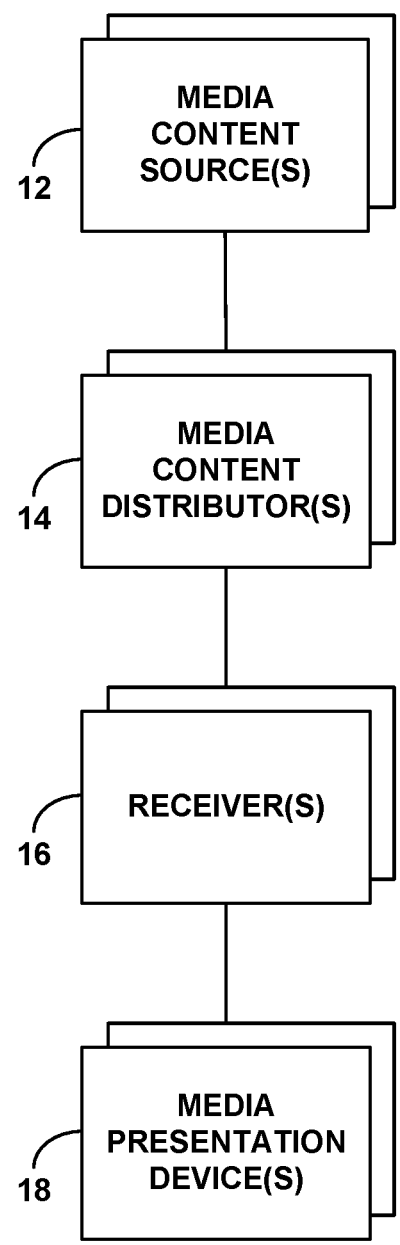
FIG. 1 is a simplified block diagram of an example system in which various disclosed principles can be applied.

Referring to the drawings, FIG. 1 is a simplified block diagram of an example system in which various disclosed principles can be applied. It will be understood, however, that this and other arrangements and processes described herein can take various other forms. For instance, elements and operations can be re-ordered, distributed, replicated, combined, omitted, added, or otherwise modified. Further, it will be understood that functions described herein as being carried out by one or more entities could be implemented by and/or on behalf of those entities, through hardware, firmware, and/or software, such as by one or more processing units executing program instructions or the like.

As shown in FIG. 1, the example system includes one or more media content sources 12 (e.g., broadcasters, web servers, etc.), one or more media content distributors 14 (e.g., multi-channel distributors, such as cable providers, satellite providers, over-the-air broadcast providers, web aggregators, etc.), one or more media content receivers 16 (e.g., cable receivers, satellite receivers, over-the-air broadcast receivers, computers or other streaming media receivers, etc.), and one or more clients or media presentation devices 18 (e.g., televisions or other display devices, loudspeakers or other audio output devices, etc.)

In practice, for instance, the media content sources 12 could be national broadcasters, such as ABC, NBC, CBS, FOX, HBO, and CNN, the media content distributors 14 could be local affiliates and/or other local content distributors in particular designated market areas (DMAs), and the receivers 16 and media presentation devices 18 could then be situated at customer premises, such as homes or business establishments. With this or other arrangements, the content sources 12 could deliver media content to the content distributors 14 for distribution to receivers 16 at customer premises, and the content distributors could distribute the media content to the receivers 16 on discrete channels (e.g., particular frequencies). Each receiver could then respond to user input or one or more other triggers by tuning to a selected channel and outputting to a media presentation device 18 the media content that is arriving on the selected channel. And the media presentation device 18 could receive and render the media content (e.g., display or otherwise present the content).

In this arrangement, as the media presentation device receives and renders this media content, the media presentation device may have no indication of the channel on which the media content is arriving, i.e., of the channel to which the receiver is tuned. Rather, the media presentation device may be configured simply to receive the media content as a media stream from the receiver and to render the received media content. Per the present disclosure, however, the media presentation device may be in communication with a network server and may work with the network server to facilitate identification of the channel and thus to facilitate taking useful channel-specific action.

Figure 2:
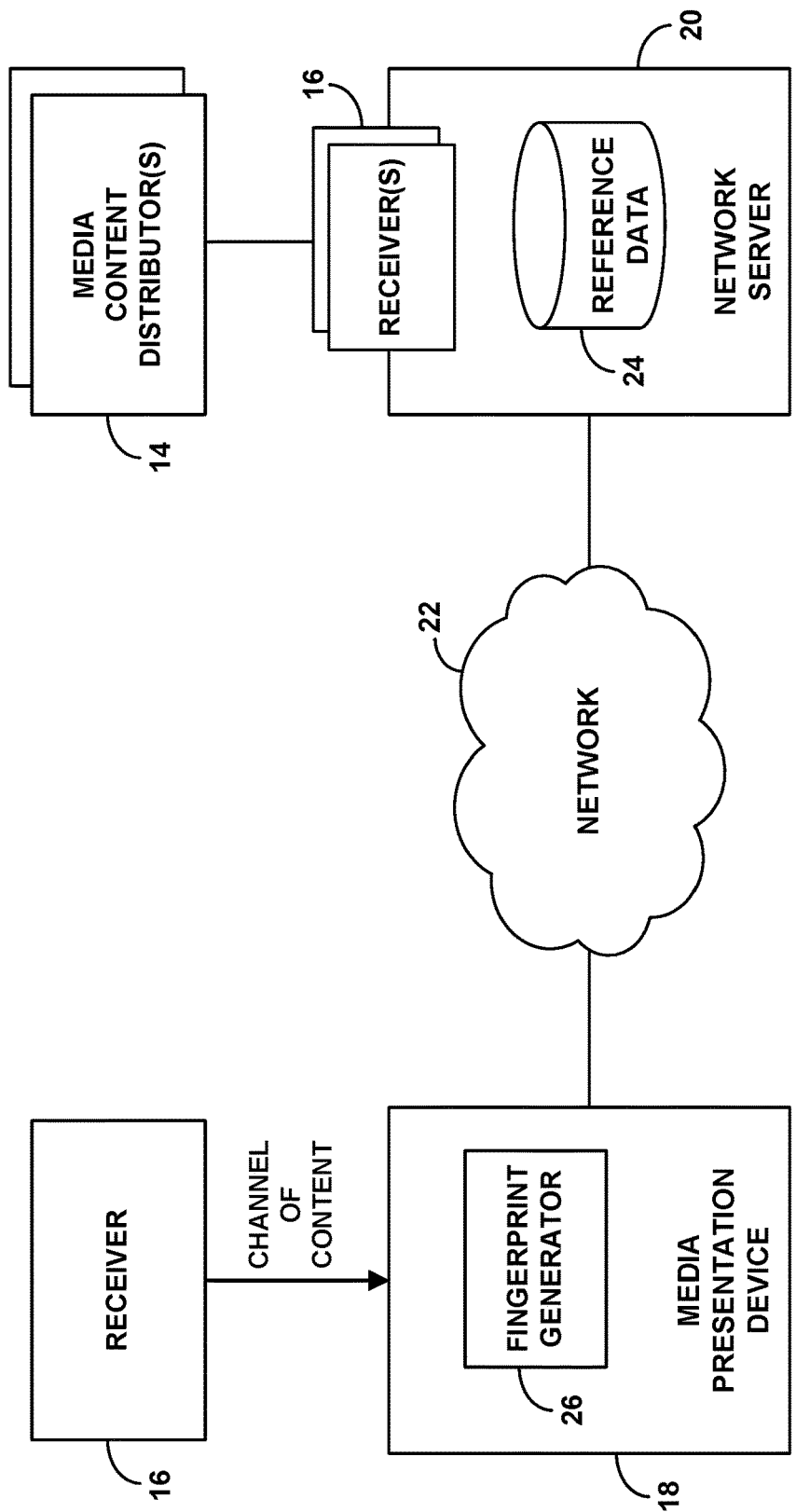
FIG. 2 is a simplified block diagram of an example network arrangement in which a media presentation device communicates with a network server to facilitate implementing various disclosed principles.

FIG. 2 illustrates an example network arrangement in which a media presentation device 18 is in communication with a network server 20 via a network 22, such as the Internet. In practice, the media presentation device 18 may sit as a node on a local area network (LAN) at customer premises, with the media presentation device having an assigned Internet Protocol (IP) address on the LAN and the LAN having an IP address on the Internet. Further, the network server 20 may also be accessible at an IP address on the Internet. With this arrangement, the media presentation device may initiate and engage in IP communication with the network server via the Internet, to report a fingerprint of media content being rendered by the media presentation device, so as to facilitate channel identification and associated action.

As discussed above, the network server 20 or another entity operating in accordance with the present disclosure could establish or have access to reference data 24 for media content that is carried or scheduled to be carried on at least each of various channels accessible to the media presentation device 18. The reference data, which could be stored in a relational database or other form, could include a respective reference fingerprint for each channel, perhaps a reference fingerprint stream of media content that was most recently carried by the channel (e.g., on a sliding window basis covering a most recent period of time). Alternatively or additionally, the reference data could include a respective reference fingerprint (e.g., reference fingerprint stream) of each media content program (e.g., television broadcast, radio broadcast, streaming media file, etc.) that is available and/or scheduled to be carried on a particular channel. As such, the reference data could map each reference fingerprint to a channel on which the associated media content (i.e., the content uniquely identified by the reference fingerprint) is or may be carried.

In mapping reference fingerprints to channels, the reference data could characterize the channels by various attributes, to help distinguish the channels from each other. For example, where a receiver or other such device provides multiple different channels selectable by channel number, the reference data could characterize the channels by their respective channel numbers. And as another example, where each channel carries a particular content source's content, such as the content of one of a particular broadcaster for instance, the reference data could characterize the channels by their respective content sources' identities. Still further, where more than one content distributor (e.g., multichannel distributor) distribute content sources' content, the reference data could characterize the channels by their respective content distributors' identities. In practice, the reference data could correlate each reference fingerprint with one or more of these or other attributes.

The network server 20 or other entity operating in accordance with the present disclosure could establish some or all of this reference data by analyzing media content arriving on each of the various channels (e.g., at least the media content arriving on each of various channels that are available to a receiver that serves the media presentation device). To facilitate this, as shown, the server could include or be interconnected with one or more receivers 16 that are configured to receive media content from one or more of the media content distributors 14 on various channels in much the same way that receivers would be configured to receive content at customer premises. For instance, the server could include or be interconnected with one or more cable-TV set top boxes, radios, computers, or other media receivers, or could be configured to emulate one or more such receivers. The server could then be configured to receive and analyze the respective media content arriving on each channel and to generate for each channel a reference fingerprint of the channel's media content, using any media fingerprinting process now known or later developed (e.g., computing a hash on a per frame or other basis, or otherwise identifying, extracting and digitally representing component features unique to the media content).

In practice, the server could be configured to receive concurrently on multiple such channels (perhaps all of the channels) and to analyze and generate respective fingerprints for the channels in parallel, or the server might be configured to hop from channel to channel, possibly repeatedly cycling through the channels, to analyze and generate a respective fingerprint for each channel. Further, the server could continue to do this in real-time, saving a respective fingerprint of a most recent time window of media content for each channel, for reference. And the server could record each channel's reference fingerprint in the reference data in association with a characterization of the channel (e.g., with attributes such as those noted above) and timestamp information indicating a time of receipt of the associated media content. Here, the server would have knowledge of each channel (e.g., channel number), just as a receiver would normally have knowledge of the channel to which the receiver is tuned. Further, the server may have access to guide information or other such data specifying attributes of each such channel (e.g., content source identity, content distributor identity, etc.), so that the server can determine and record channel attributes respectively for each reference fingerprint.

Alternatively or additionally, the server could receive or perhaps establish such reference fingerprints for media content programs that are available or scheduled to be provided on particular channels. For instance, providers or distributors of various media content programs could generate reference fingerprints for the media content programs, again using any media fingerprinting process now known or later developed, and those reference fingerprints could be provided to the server. Alternatively, the server could receive advance copies of the media content programs and could itself generate such reference fingerprints. Further, the server could receive or determine from program guide information the channel on which the media content program is available or scheduled to be provided, and perhaps a day and time at which the media content is scheduled to be provided. The server could then record each media content program's reference fingerprint in the reference data in association with the channel on which the media content program is available or scheduled to be carried, likewise with associated channel attributes, and perhaps in association with a day and time at which the media content program is scheduled to be provided.

Given this or other such reference data, when the server is presented with a fingerprint of media content that was received on an unknown channel, the server could match the fingerprint with one of the stored reference fingerprints, using any fingerprint matching process now known or later developed, and could thereby conclude that the media content at issue arrived on the channel that the reference data maps to the matching reference fingerprint. Thus, if the server is faced with a fingerprint of media content that is being rendered by the media presentation device 18, the server could compare the fingerprint with the reference fingerprints in the reference data. And if the server thereby finds a matching reference fingerprint, then the server could identify the channel that the reference data maps with the matching reference fingerprint and could conclude that that is the channel on which the media presentation device is receiving the media content (i.e., that that is the channel carrying the media content being rendered by the media presentation device). In turn, the server could responsively take a channel-specific action based on the identified channel, or cause or enable one or more other entities to take a channel-specific action based on the identified channel.

To facilitate this, the media presentation device 18 or another entity could be configured to generate a fingerprint of the media content that is being rendered by the media presentation device and to transmit the fingerprint to server 20 for analysis.

For instance, as shown in FIG. 2, the media presentation device could include a fingerprint generator 26, which could be configured to generate a digital fingerprint of media content being rendered by the media presentation device. Such a fingerprint generator could be configured to generate the fingerprint of media content as the media presentation device is receiving the media content on a channel from a receiver 16 and/or as the media presentation device is processing the media content for presentation. As such, the fingerprint generator could receive as input a copy of the media content arriving at the media presentation device from the receiver and/or being processed for presentation by the media presentation device, and to apply any media fingerprinting process now known or later developed to generate a fingerprint of the media content.

In practice, the fingerprint generator could be configured to generate such a fingerprint as a fingerprint stream on an ongoing basis, such as on a per frame basis (e.g., per key-frame basis) or other basis. And the media presentation device could be configured to transmit the fingerprint via network 22 to a server 20 for analysis. By way of example, the media presentation device could be configured to periodically or from time to time transmit to the server a fingerprint representing a latest frame, series of frames or other portion of the media content being rendered by the media presentation device. In particular, the media presentation device could generate a message carrying the latest generated fingerprint, along with one or more timestamps and/or other such data as well as an identifier of the media presentation device, and could transmit the message to the server's IP address. And the server may thereby receive the fingerprint for analysis.

Alternatively, the media presentation device could transmit to the server, and the server could thus receive, various data regarding the media content being rendered by the media presentation device, likewise on an ongoing basis or other basis, to enable the server itself or another entity to generate a fingerprint of the media content being rendered by the media presentation device. For example, the media presentation device could transmit to the server portions of the media content being rendered by the media presentation device, such as individual frames (e.g., snapshots) or other segments of the media content. And the server could apply any media fingerprinting process now known or later developed to generate a fingerprint of the media content for analysis.

Through the process described above, the server could then compare the fingerprint of the media content being rendered by the media presentation device with the reference fingerprints in the reference data, using any digital fingerprint comparison process now known or later developed. And as noted above, if the server thereby finds a matching reference fingerprint, the server could determine the channel that the reference data maps with the matching reference fingerprint and could conclude that the determined channel is the channel carrying the media content being rendered by the media presentation device.

In response to thereby determining the channel at issue, the server could then take, or cause to be taken, one or more channel-specific actions based on the determination of the channel. In particular, the server itself could take action based on the channel determination, or the server could signal to another entity, perhaps to the media presentation device, to cause the other entity to take action based on the channel determination.

For example, the server could record the fact that the media presentation device is presenting content of that particular channel, as part of a channel rating or analytics system to measure the extent to which particular channels are being presented by media presentation devices. For instance, the media presentation device could regularly (e.g., periodically) report to the server a fingerprint of the media content that the media presentation device is rendering, and the server could carry out processes such as those discussed herein to determine the channel being rendered. Each time the server thus determines that a channel is being rendered, the server could add to a count or other statistic of the channel being rendered, as data to indicate the extent to which that channel is being presented.

As another example, the server could responsively cause the media presentation device to present supplemental content, such as a pop-up advertisement as discussed above, a commercial break, or a channel identification, among other possibilities, possibly as a replacement for one or more portions of the media content. For instance, given knowledge of the channel at issue, the server could generate or select (e.g., from server data storage) particular supplemental media content associated specifically with the determined channel and could transmit the supplemental media content to the media presentation device for the media presentation device to present in conjunction with the media content that the media presentation device is receiving from the receiver. The media presentation device could thus receive the supplemental media content from the server and present it in conjunction with the media content that the media presentation device is receiving from the receiver.

In practice, this process could involve the server receiving in real-time from the media presentation device a fingerprint of the media content being rendered by the media presentation device and the server determining that the received fingerprint matches a reference fingerprint of media content that the server is concurrently receiving (or has scheduled for the same time) on a known channel.

In some cases, however, there may be a time difference between when the media presentation device renders the media content and timestamps and transmits the fingerprint to the server and when the server receives the media content on the known channel and otherwise has the reference fingerprint timestamped. The server could account for this time difference by comparing the received fingerprint over a sliding window of the reference fingerprint or vice versa. Further, the server could account for this time difference when taking action in response to a determined match between the received fingerprint and the reference fingerprint. For example, if the media presentation device receives the media content sufficiently earlier than the server's timestamp for the content (e.g., more than a few seconds earlier), the server could still identify a fingerprint match and could record analytics data. But in response to detecting that time difference, the server might forgo having the media presentation device present associated supplemental content, to help avoid a situation where the media presentation device presents the supplemental content too late (e.g., is out of sync) from a user's perspective. On the other hand, if the server detects a fingerprint match for a sufficient period of time and/or determines that the matching content will continue, the server may have the media presentation device present supplemental content even when faced with such a time difference.

In any event, through these or other such processes, a network server or other entity can determine the channel on which the media presentation device is receiving the media content at issue. And once the entity determines the channel, the entity may then take action based on the channel determination. Alternatively, the entity could signal to another entity, perhaps back to the media presentation device, to cause the other entity to take action based on the channel determination. Other examples are possible as well.

In line with the discussion above, the server 20 or other entity that has access to reference data as noted above could be configured to identify multi-match scenarios, perhaps by detecting among the reference data various reference fingerprints that match each other.

In one implementation, for instance, the server could regularly analyze the reference data in search of multi-match scenarios, comparing pairs of reference fingerprints in the reference data using any now known or later developed media fingerprint matching process, in an effort to find reference fingerprints that match each other. Upon finding each such match of at least two of the reference fingerprints, the server could then flag the reference fingerprints as being a multi-match group. Such a flag could indicate that there will be a potential ambiguity if the fingerprint of media content being rendered by the media presentation device matches any of the reference fingerprints in the flagged multi-match group. The server could flag the reference fingerprints as being a multi-match group in various ways. For instance, the server could cross-reference the reference fingerprints of the multi-match group in the reference data, to indicate that they are members of a multi-match group. Alternatively, the server could store a single copy of the reference fingerprint and associate that copy with various channels on which the media content represented by the reference fingerprint is carried.

With this implementation, when the server receives from a media presentation device a fingerprint of media content being rendered by the media presentation device and the server determines that the received fingerprint matches a reference fingerprint, the server could then readily determine from the reference data whether a multi-match situation exists. If the matching reference fingerprint is not flagged as being a member of a multi-match group, then the server could conclude that a single-match situation (rather than a multi-match situation) exists, in which case, as discussed above, the server could then readily determine from the reference data the channel associated with the matching reference fingerprint and could conclude that that is the channel carrying the media content being rendered by the media presentation device. Whereas, if the matching reference fingerprint is flagged as being a member of a multi-match group, then the server could conclude that a multi-match situation (rather than a single-match situation) exists, in which case the server may need to perform a disambiguation process to help identify the channel at issue from among those associated with the reference fingerprints of the multi-match group.

Alternatively, in another implementation, the server could identify a multi-match group at the time the server receives a fingerprint from the media presentation device. For instance, when the server receives the fingerprint from the media presentation device, the server could compare the received fingerprint with all of the reference fingerprints in the reference data. If the server thereby detects that the received fingerprint matches only one of the reference fingerprints, then the server could conclude that a single-match situation (rather than a multi-match situation) exists, in which case the server could then readily determine from the reference data the channel associated with the matching reference fingerprint and could conclude that that is the channel carrying the media content being rendered by the media presentation device. Whereas, if the server detects that the received fingerprint matches two or more of the reference fingerprints, then the server could conclude that a multi-match situation (rather than a single-match situation) exists, in which case the server may need to perform a disambiguation process to help identify the channel at issue from among those associated with the reference fingerprints of the multi-match group.

Note that the process of detecting a multi-match situation involving two or more reference fingerprints could be performed even if the two reference fingerprints represent the same media content carried on two different channels at a time delay relative to one another, i.e., where the presentation of the media content on one of the channels is time shifted in relation to presentation of the same media content on another one of the channels. The fingerprint matching process could account for this time shifting and could still find a match if the fingerprints otherwise match each other, such as by comparing one fingerprint over a sliding window with the other fingerprint. For instance, the process of finding matching reference fingerprints within the reference data could involve searching for reference fingerprints that match one another and are presented and/or scheduled at respective times that are within a threshold time interval of each other.

As noted above, when the server or other entity carrying out this analysis detects that the fingerprint of the media content being rendered by the media presentation device matches multiple reference fingerprints corresponding with multiple channels, the entity could apply a disambiguation process based on context information, to help determine which of the channels associated with the multi-match group is the actual channel carrying the media content being rendered by the media presentation device.

Further, in accordance with the present disclosure, a useful example of such context information is location of the media presentation device. In particular, it may be the case that the same media content is being provided or scheduled to be provided in multiple different locations, such as multiple different geographic markets, metropolitan areas, or the like, on a different respective channel in each location. In that case, each of two or more reference fingerprints in a multi-match group could be associated with a respective location, and knowledge of location of the media presentation device that is rendering the media content could then be used as a basis (alone or in combination with one or more other factors) to disambiguate between the two or more matching reference fingerprints.

Figure 3:
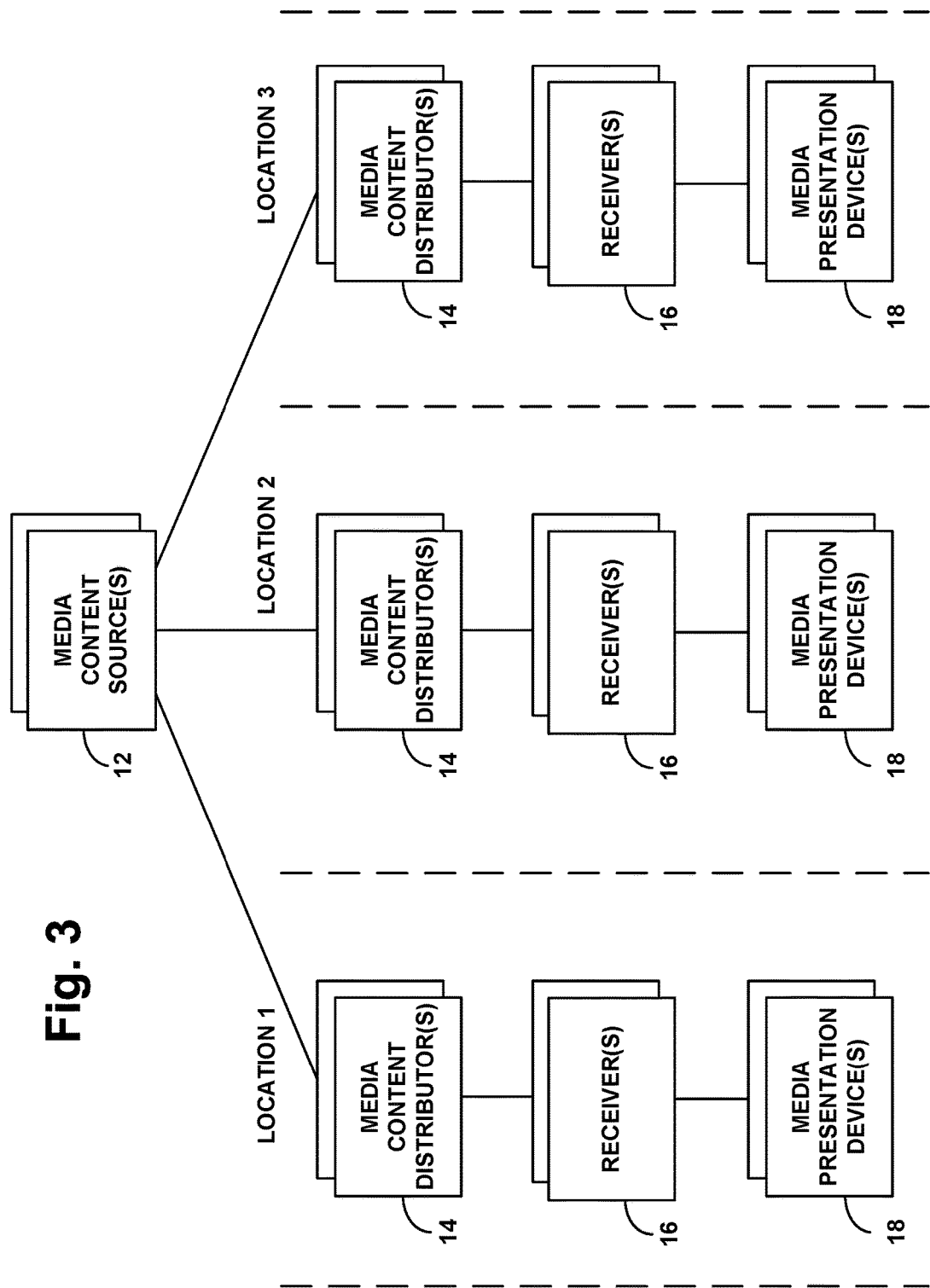
FIG. 3 is a simplified block diagram of an example system including distribution of media in multiple different locations.

FIG. 3 depicts an example system where this could occur in practice, as a variation or more specific representation of the arrangement shown in FIG. 1. As shown in FIG. 3, the example system includes one or more media content sources 12 and then includes one or more media content distributors 14 in each of multiple separate locations. These locations could be geographically separate areas, such as discrete geographic markets (e.g., DMAs), metropolitan areas, or the like. With this arrangement, the one or more content distributors in each location could be arranged to deliver media content to one or more receivers 16 in the location, such as receivers at customer premises in the location. And the receivers could then be configured to deliver media content to media presentation devices 18 in the location, such as media presentation devices at customer premises in the location.

As an example of this, a representative content source could be a broadcaster that provides a national content feed to a separate affiliate respectively in each of three separate market areas, and each affiliate could distribute the content feed on a respective local channel to receivers in its market area. Through user input or the like, receivers in each market could then be selectively tuned to the local channel carrying that content feed in their market and could output the content feed to media presentation devices, and the media presentation devices could render the content feed for presentation. With this example arrangement, the three affiliates' local channels would all carry the same national content feed as each other. Therefore, the reference data 24 discussed above could have a multi-match group of the reference fingerprints of these three local channels.

To facilitate location-based disambiguation of channel identity in this or any other arrangement, the reference data could indicate the location of each reference fingerprint's associated channel, i.e., the location where the associated channel is provided. And the server could be configured to determine a location of the media presentation device at issue and to compare the determined location with the locations indicated for the reference fingerprints in the multi-match group. Upon thereby finding that the media presentation device location matches a location indicated for one of the reference fingerprints in the multi-match group, the server could then conclude based at least on that finding (possibly along with one or more other considerations) that the channel associated with that reference fingerprint is the channel carrying the media content being rendered by the media presentation device.

The reference data could indicate the location of each reference fingerprint's associated channel in various ways. For instance, the reference data could hold for each reference fingerprint a database record that includes the reference fingerprint and the associated channel location. Alternatively, the reference data could hold separate sets of reference fingerprints respectively for each location. Other arrangements are possible as well.

Server 20 could record such location information as the server generates the reference fingerprints. By way of example, the server could include or be interconnected with receivers 16 that are configured to receive media content on the various channels on a per-location basis, such as one or more receivers per location, with each receiver being configured to receive the channels that are available to media presentation devices in its associated location. The server could thus receive and analyze media content on each of these channels and generate reference fingerprints as noted above, and the server could map the reference fingerprint of each channel's media content to the channel's respective location and identity.

Alternatively, the server could receive reference fingerprints from sources or distributors of media content as noted above and could receive an indication of, or determine, for each reference fingerprint the location of the channel on which the media content is arriving or is scheduled to arrive, and the server could likewise record the reference fingerprint of each channel's media content, mapping each reference fingerprint to the channel's respective location and identity.

The server could then identify multi-match scenarios in this reference data in the manner discussed above. Here, however, a representative multi-match group could include matching reference fingerprints for separate channels that are provided in respective, different locations. For instance, in the example discussed above where a broadcaster provides a content feed to multiple separately located affiliates for distribution to receivers in their respective locations, the reference data could include matching reference fingerprints for the affiliates' respective channels providing this content. Each reference fingerprint would thus be mapped to a different location and a different respective channel.

Further, the server could determine the location of the media presentation device in various ways. By way of example, the media presentation device could be provisioned (e.g., through user input) with an indication of its location, and the media presentation device could include that indication of its location in its communication providing the server with the fingerprint for analysis. Or the media presentation device could determine its location through any location-determination-system now known or later developed (e.g., using the Global Positioning System, or based on nearby WiFi network identifiers, etc.) and could likewise indicate its location in its communication to the server. Thus, the server could determine the media presentation device's location by reading the indication of location from a communication received from the media presentation device.

As another example, the server could determine the location of the media presentation device based on the media presentation device's IP address, perhaps the global IP address of a LAN on which the media presentation device operates. For instance, the server could query a database that maps IP addresses to locations so as to determine the location corresponding with the source IP address of the communication received from the media presentation device.

Still further, as another example, the server could determine the location of the media presentation device based on identification of location-distinguishing content being rendered by the media presentation device. For instance, although channels in different locations may generally carry the same media content as each other (e.g., the same media content programs as each other), it may be the case that each location's channel carries at least some media content that is specific to its location. By identifying that location-specific media content as part of the media content being rendered by the media presentation device, the server could thereby determine which reference fingerprint in the multi-match group corresponds with the channel on which media content is arriving at the media presentation device.

Without limitation, examples of such location-specific content include a local commercial break or local news in the media content being rendered by the media presentation device. For instance, in the example discussed above, each local affiliate may inject a different respective commercial break in the national content feed, with the commercial break in each location being specific to the affiliate's location, such as advertising a local business or providing other local information. Alternatively, each local affiliate may include a news program on its channel, with the news program being specific to the affiliate's location. If the server could identify the presence of such a local commercial break or local news program being rendered by the media presentation device, the server could use that identified local commercial or local news program as a basis to determine which reference fingerprint is the correct one.

To facilitate disambiguation based on inclusion of a local commercial or local news program in the media content being rendered by the media presentation device, the reference data 24 could additionally include reference fingerprints of various commercials (media content defining commercials) or news programs (media content defining news programs) on a per-location basis. For instance, the server could be provided with the commercials or news programs along with indications of location per commercial or news program, and the server could generate reference fingerprints of the commercials or news programs using any media content fingerprinting process now known or later developed and could store each such reference fingerprint in correlation with an indication of the associated location of the commercial or news program. Alternatively, the server could receive and store each such reference fingerprint along with the reference fingerprint's associated location.

Provided with reference fingerprints of commercials or news programs on a per-location basis, the server could then determine that a fingerprint received from the media presentation device matches the reference fingerprint of a particular commercial or news program and thus that the location of the media presentation device is the location that the reference data associates with the matching commercial's or news program's reference fingerprint.

In practice, for instance, the server may regularly receive from the media presentation device a fingerprint of the media content being rendered by the media presentation device. And at one point in time, the server may determine that the fingerprint from the media presentation device matches multiple reference fingerprints, thus presenting a multi-match situation. But at another point in time (before or after), optimally close in time to when the multi-match situation was identified, the server could may determine that the fingerprint from the media presentation device matches a local commercial's or news program's reference fingerprint and thus that the media presentation device is at the location that the reference data associates with that local commercial's reference fingerprint. The server could then determine which reference fingerprint in the multi-match group is associated with the determined location and could thereby conclude that that reference fingerprint's associated channel is the channel carrying media content to the media presentation device.

In this or other implementations, the server could determine that the location of the media presentation device matches the location associated with a particular reference fingerprint in various ways. For example, if the location of the media presentation device is particular geographic coordinates, such as latitude and longitude coordinates, and the location associated with the reference fingerprint is a location area defined by geographic coordinates, the server could determine whether the coordinates of the media presentation device fall within the location area defined for the reference fingerprint. As another example, if the location of the media presentation device is a location area (e.g., defined by geographic coordinates, zip code, or the like) and the location associated with the reference fingerprint is a location area, the server could determine if the media presentation device's location area coincides partially or fully with the reference fingerprint's location area. Other approaches are possible as well.

Once the server has determined the location of the media presentation device, the server could record an indication of that location in correlation with an identifier of the media presentation device, so as to then be able to use that location information when later seeking to resolve a multi-match situation involving the media presentation device. As noted above, the media presentation device may provide its identifier to the server when the media presentation device transmits fingerprint data to the server. Alternatively, the media presentation device may provide its identifier to the server at another time, such as during an initial configuration or registration process. The server could then store that identifier in a profile record or the like for the media presentation device, and when the server determines the location of the media presentation device, the server could store an indication of the determined location in that profile record as well. That way, when the server later receives from the media presentation device a fingerprint of media content being rendered by the media presentation device and the server encounters a multi-match situation, the server can quickly determine from the profile record the location of the media presentation device and can use that location as a basis to disambiguate as described above.

Alternatively or additionally, once the server has determined the location of the media presentation device, the server could report an indication of that location to the media presentation device, and the media presentation device could store and later report that location to the server to facilitate multi-match resolution. For example, the server could include an indication of the determined location within a response message that the server sends to the media presentation device (perhaps with a message in which the server directs the media presentation device to present particular supplemental content or the like). And the media presentation device can then programmatically store that indication of location for later use. When the media presentation device then transmits a fingerprint to the server, the media presentation device can include with its transmission the indication of location, so that the server can readily use that location as a basis to disambiguate.

Further, note that the server could use the presence of location-specific content, or for that matter other sorts of channel-specific content, in other ways to help resolve a multi-match situation. By way of example, when the server has detected that two or more reference fingerprints generally match each other, the server may further evaluate the matching fingerprints over a period of time (e.g., several hours, a day, or the like) in search of uniquely distinguishing fingerprint data, which could be a fingerprint of a local news program or other such content unique to just one of the channels. And the server could likewise evaluate the fingerprint received from the media presentation device and identify fingerprint data matching that uniquely distinguishing fingerprint data in the reference fingerprint. Upon finding such a match, the server could then conclude that the channel being rendered by the media presentation device is the channel associated with the matching reference fingerprint.

In line with the depiction in FIG. 3, it may also be the case that more than one media content distributor provides the same media content in a given location, but each media content distributor provides the media content on a different respective channel. For instance, in or for a given location, in a given location, there may be a cable-TV provider, a satellite-TV provider, an over-the-air broadcast TV provider, and a streaming media provider, all providing the same national or local-affiliate content feed, but each on their own respective channel. With such an arrangement, a multi-match group could contain matching reference fingerprints for multiple such channels in the same location.

To help further disambiguate in this situation, the sever may also take into account the identity of the media content distributor. For example, the server could determine that the location of the media presentation device matches the location of two or more of the reference fingerprints in a multi-match group, and the server could further (i) determine the identity of the media content distributor that provides media content to the receiver feeding the media presentation device, and (ii) determine which of the two or more reference fingerprints is associated with a channel provided by that media content distributor. The server could then conclude that the channel associated with the determined reference fingerprint is the channel that is carrying the media content being rendered by the media presentation device.

In this implementation, the reference data could indicate for each reference fingerprint the media content distributor that provides the associated channel. For instance, the server could establish or receive this information and could store each reference fingerprint in a database relationship with an indication of the media content provider that provides the associated channel.

Further, the server could determine in various ways which media content distributor provides the channel that carries media content being rendered by the media presentation device. For instance, the media presentation device could be provisioned (e.g., through user input) with an indication of the media content distributor that provides channels to the receiver feeding the media presentation device, and the media presentation device could include that indication in its communication to the server providing the fingerprint for analysis. Thus, the server could determine the media content distributor by receiving this indication from the media presentation device. Alternatively, the reference data could include distributor-specific reference fingerprints, such as fingerprints of commercials, onscreen guides, logos, slogans, or the like, that are specific to particular media content distributors, and the server could determine the media content distributor in a given instance by determining that a fingerprint provided by the media presentation device matches such a distributor-specific reference fingerprint. Other approaches are possible as well.

Note that while the forgoing discussion focuses primarily on server 20 identifying a multi-match situation and then disambiguating based on consideration of context, some or all of the operations described could alternatively be carried out by one or more other entities, in place of or in cooperation with the server.

For instance, one or more of the operations could be carried out by the media presentation device itself or by an adjunct system in local communication with the media presentation device. By way of example, the media presentation device itself could be provisioned with or have access to reference data like that described above, and the media presentation device could itself refer to the reference data to identify a multi-match situation, to disambiguate, and to identify the channel that provides the media content being rendered by the media presentation device. Further, the media presentation device could then itself take channel-specific action, such as presenting channel-specific content, recording channel presentation, or the like, or could cause one or more other entities to take such action. Other variations are possible as well.

Figure 4:
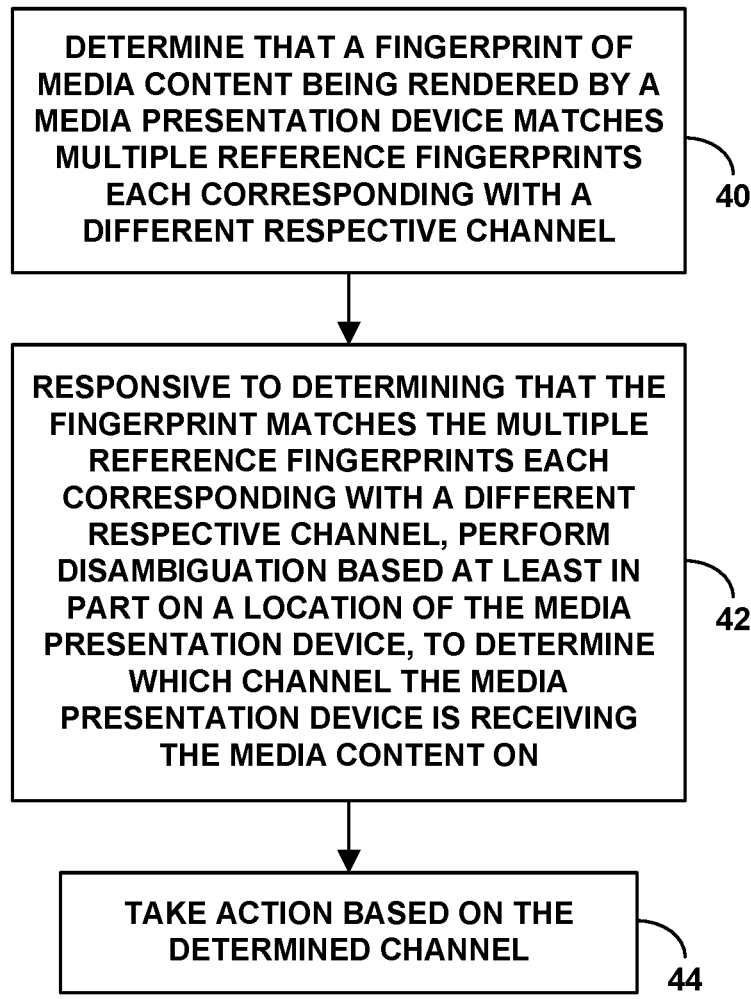
FIG. 4 is a flow chart depicting operations that can be carried out in accordance with the present disclosure.

FIG. 4 is next a flow chart depicting a method that can be carried out in line with the discussion above. One or more of the operations in the method depicted by FIG. 4 could be carried out by one or more entities, including, without limitation, a network server, a media presentation device, and/or one or more entities operating on behalf of or in cooperation with these or other entities. Any such entity could embody a computing system, such as a programmed processing unit or the like, configured to carry out one or more of the method operations. Further, a non-transitory computer readable medium (e.g., disc storage, flash storage, or the like) could have stored thereon instructions executable by a processing unit to carry out the various depicted operations.

As shown in FIG. 4, at block 40, the method includes a computing system determining that a fingerprint of media content (e.g., video content and/or audio content) being rendered by a media presentation device matches multiple reference fingerprints each corresponding with a different respective channel. At block 42, the method then includes, responsive to determining that the fingerprint matches the multiple reference fingerprints each corresponding with a different respective channel, performing disambiguation based at least in part on location of the media presentation device, to determine which channel the media presentation device is receiving the media content on (e.g., to determine the channel carrying the media content that is being rendered by the media presentation device). And at block 44, the method includes taking action based on the determined channel.

In line with the discussion above, the computing system could be other than the media presentation device, and the fingerprint of the media content being rendered by the media presentation device could be generated by the media presentation device. The method could then involve the computing system receiving from the media presentation device the fingerprint of media content being rendered by the media presentation device.

Further, as discussed above, the multiple reference fingerprints could be selected from a plurality of reference fingerprints in reference data, in which case determining that the fingerprint of media content being rendered by the media presentation device matches the multiple reference fingerprints could involve (i) comparing the fingerprint of media content being rendered by the media presentation device with the plurality of reference fingerprints in the reference data and (ii) based on the comparing, determining that the fingerprint of media content being rendered by the media presentation device matches the multiple reference fingerprints.

Still further, as discussed above, the method could involve detecting and flagging a multi-match group including the multiple reference fingerprints, in which case determining that the fingerprint of media content being rendered by the media presentation device matches the multiple reference fingerprints could involve determining that the fingerprint matches the reference fingerprints of the flagged multi-match group.

Additionally in line with the discussion above, the act of performing disambiguation based at least in part on the location of the media presentation device could involve (i) determining the location of the media presentation device and (ii) using the determined location of the media presentation device as a basis to determine which one of the matching reference fingerprints corresponds with the channel on which the media presentation device is receiving the media content.

And as discussed above, the act of determining the location of the media presentation device could take various forms. For instance, it could be based on a network address (e.g., IP address) of the media presentation device and/or on location information reported by the media presentation device. Alternatively or additionally, it could involve (i) detecting location-specific content based on fingerprint evaluation of the media content being rendered by a media presentation device and (ii) determining the location of the media presentation device based on the detected location-specific content.

Still further, the location-specific content could comprise a local commercial or local news program. And in that case, the act of determining the location of the media presentation device based on the detected location-specific content could involve (i) determining a location associated with the local commercial and (ii) based on the determined of the location associated with the local commercial, determining that the location of the media presentation device is the location associated with the local commercial.

In addition, as discussed above, the act of performing disambiguation based at least in part on the location of the media presentation device could involve performing the disambiguation based at least in part on the location of the media presentation device and based at least in part on an identity of a distributor of the media content being rendered by the media presentation device. For instance, the act could involve (i) determining that two or more of the matching reference fingerprints correspond with channels in the same location as each other, (ii) determining the identity of the distributor of the media content being rendered by the media presentation device, and (iii) selecting one of the two or more matching reference fingerprints based at least in part on the selected matching reference fingerprint corresponding with a channel provided by the determining distributor of the media content being rendered by the media presentation device.

From another perspective, as discussed above, each reference fingerprint of the multiple reference fingerprints could have an associated channel location, in which case performing disambiguation based on the location of the media presentation device could involve (i) determining the location of the media presentation device, (ii) identifying, based on the determined location of the media presentation device one of the matching reference fingerprints based at least in part on matching of the determined location of the media presentation device with the associated channel location of the identified reference fingerprint, and (iii) based at least in part on the identifying, determining that the channel with which the identified reference fingerprint corresponds is the channel on which the media presentation device is receiving the media content.

Further, as discussed above, the act of taking action based on the determined channel could also take various forms. For example, the action could include (i) causing supplemental channel-specific content to be presented in conjunction with the media content being rendered by the media presentation device and/or (ii) recording presentation of the determined channel for use in a channel ratings system.

Figure 5:
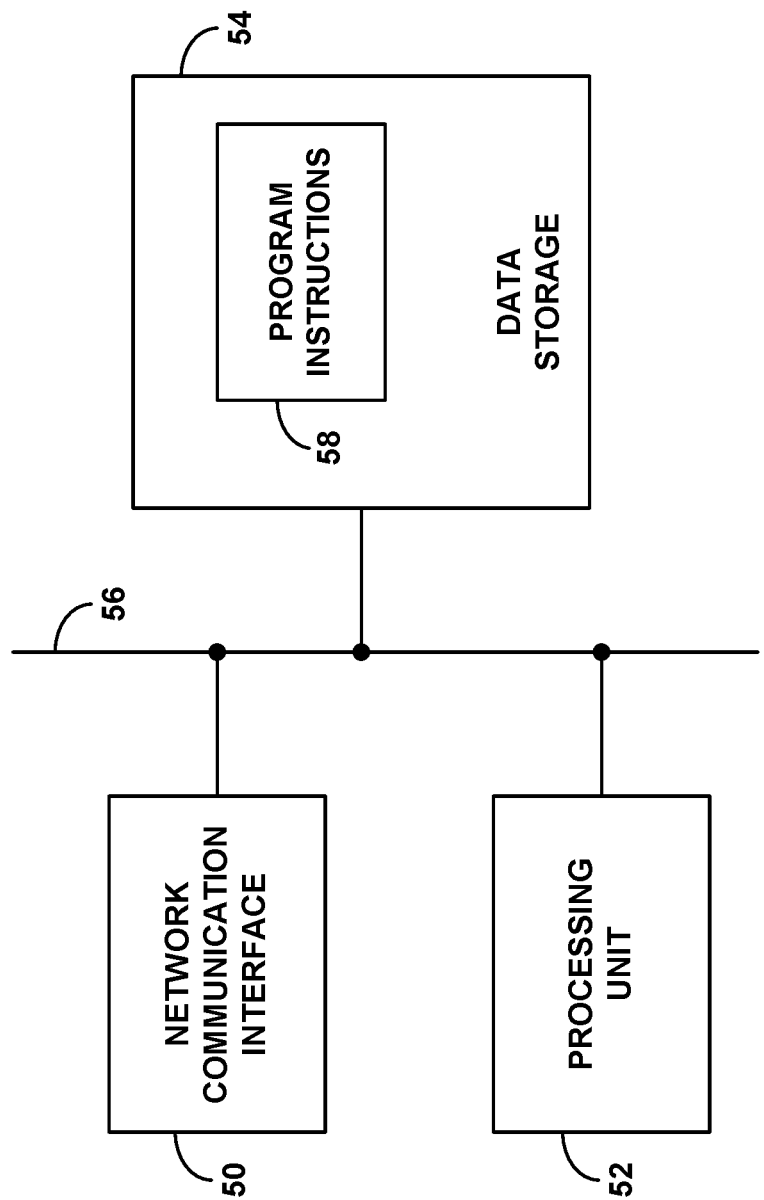
FIG. 5 is a simplified block diagram of an example network server.

FIG. 5 is next a simplified block diagram of an example system operable in accordance with the present disclosure. This system could represent a network server as described above, and/or one or more other entities (possibly including the media presentation device). As shown in FIG. 5, the example system includes a network communication interface 50, a processing unit 52, non-transitory data storage 54, any or all of which could be integrated together or, as shown, communicatively linked together by a system bus, network, or other connection mechanism 56.

Network communication interface 50 could comprise one or more physical network connection mechanisms to facilitate communication on a network such as network 22 discussed above, and/or for engaging in direct or networked communication with one or more other local or remote entities. As such, the network communication interface could comprise a wireless or wired Ethernet interface or other type of network interface, for engaging in IP communication and/or other type of network communication.

Processing unit 52, could then comprise one or more general purpose processors (e.g., microprocessors) and/or one or more specialized processors (e.g., application specific integrated circuits). And non-transitory data storage 54 could comprise one or more volatile and/or non-volatile storage components, such as optical, magnetic, or flash storage.

As shown, data storage 54 then stores program instructions 58, which could be executable by processing unit 52 to carry out various operations described herein. For example, the program instructions could be executable to (i) receive from a media presentation device, via the network communication interface, a fingerprint of media content being rendered by the media presentation device, (ii) determine that the received fingerprint matches multiple reference fingerprints each corresponding with a different respective channel, (iii) responsive to determining that the received fingerprint matches the multiple reference fingerprints each corresponding with a different respective channel, perform disambiguation based at least in part on a location of the media presentation device, to determine which channel carries the media content being rendered by the media presentation device, and (iv) take action based on the determined channel.

Various features described above could be applied in this context as well. For example, the act of performing disambiguation based at least in part on the location of the media presentation device could involve performing disambiguation based at least in part on (i) the location of the media presentation device and (ii) an identity of a media content distributor that provides media content to a receiver feeding the media presentation device. Further, the act of taking action based on the determined channel could involve causing the media presentation device to take action based on the determined channel.

Figure 6:
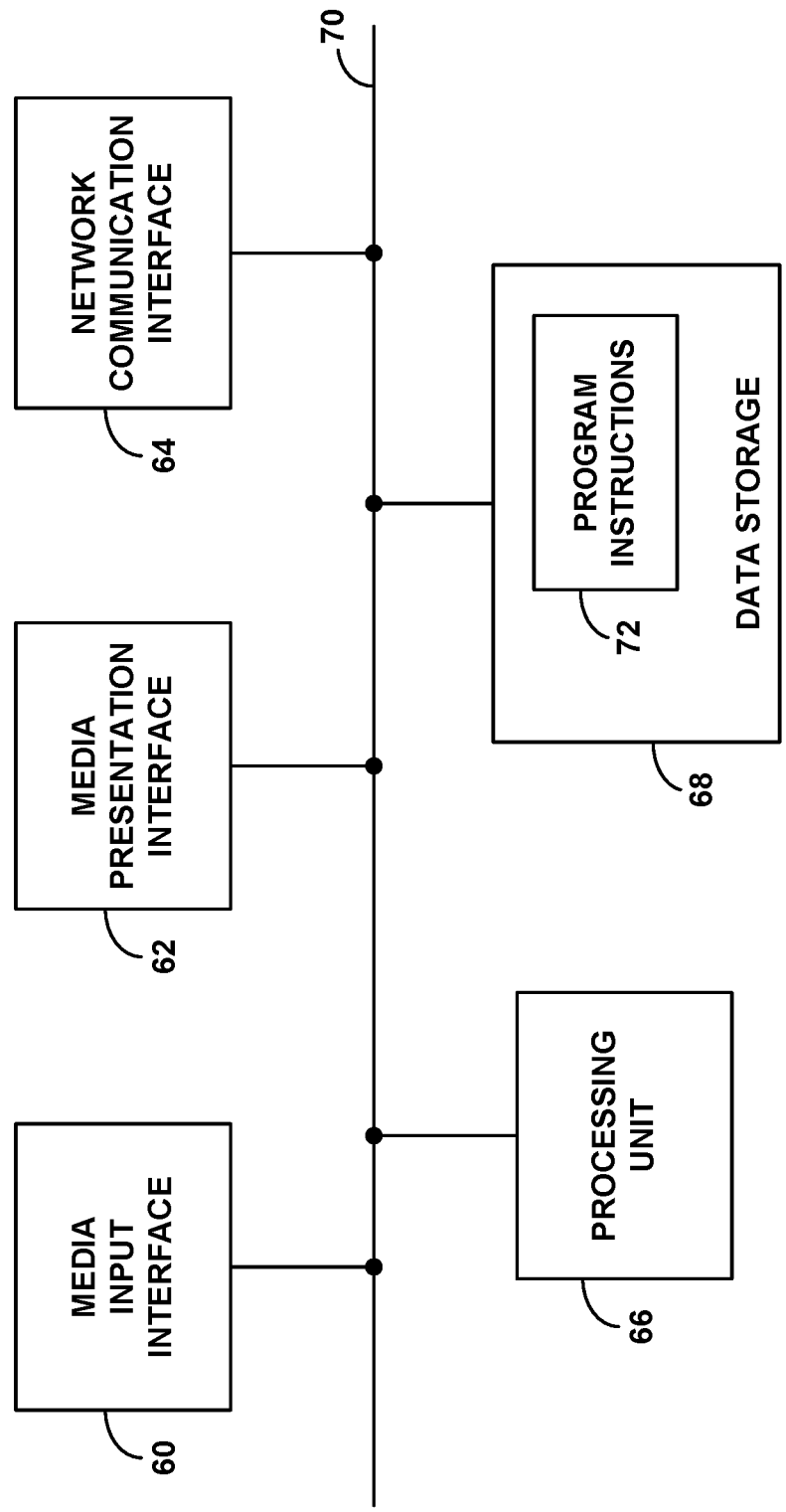
FIG. 6 is a simplified block diagram of an example media presentation device.

Finally, FIG. 6 is a simplified block diagram of an example media presentation device operable in accordance with the present disclosure. In line with the discussion above, this media presentation device could take various forms. For instance, it could be a television, computer monitor, or other device that operates to receive and render video content, and/or it could be a loudspeaker, a pair of headphones, or other device that operates to receive and render audio content. Numerous other examples are possible as well.

As shown in FIG. 6, the example media presentation device includes a media input interface 60, a media presentation interface 62, a network communication interface 64, a processing unit 66, and non-transitory data storage 68, any or all of which could be integrated together or, as shown, communicatively linked together by a system bus, network, or other connection mechanism 70.

Media input interface 60 could comprise a physical communication interface for receiving media content to be presented by the media presentation device. As such, the media input interface could include one or more wired and/or wireless interfaces for establishing communication with and receiving media content in analog or digital form from a receiver or other device or system. For example, the media input interface could include one or more interfaces compliant with protocols such as DVI, HDMI, VGA, USB, BLUETOOTH, WIFI, among numerous others.

Media presentation interface 62 could then comprise one or more components to facilitate presentation of the received media content. By way of example, the media presentation interface could comprise a user interface such as a display screen and/or a loudspeaker, as well as one or more drivers or other components for processing the received media content to facilitate presentation of the content on the user interface.

Network communication interface 64 could comprise a physical network connection mechanism to facilitate communication on a network such as network 22 discussed above, and/or for engaging in direct or networked communication with one or more other local or remote entities. As such, the network communication interface could comprise a wireless or wired Ethernet interface or other type of network interface, for engaging in IP communication and/or other type of network communication.

Processing unit 66 could then comprise one or more general purpose processors (e.g., microprocessors) and/or one or more specialized processors (e.g., application specific integrated circuits). And non-transitory data storage 68 could comprise one or more volatile and/or non-volatile storage components, such as optical, magnetic, or flash storage. Further, as shown, data storage 68 stores program instructions 72, which could be executable by processing unit 66 to carry out various operations described here. For example, the program instructions could be executable to generate on an ongoing basis a fingerprint of media content being rendered by the media presentation device, based on analysis of the media content being received at the media input interface 60 and/or being processed at the media presentation interface, and to provide the generated fingerprint on an ongoing basis to facilitate channel identification as described herein.

Exemplary embodiments have been described above. Those skilled in the art will understand, however, that changes and modifications may be made to these embodiments without departing from the true scope and spirit of the invention.

What is claimed is:

1. A method comprising:
   detecting by a computing system that digital fingerprint data representing media content being rendered by a media presentation device matches multiple instances of reference fingerprint data each corresponding with a different respective channel;
   responsive to the detecting, performing by the computing system disambiguation based at least in part on a location of the media presentation device, to determine which channel the media presentation device is receiving the media content on, wherein performing the disambiguation comprises, based at least in part on a match between the location of the media presentation device and a location associated with a particular one of the multiple instances of reference fingerprint data, determining that the respective channel with which the particular instance of reference fingerprint data corresponds is the channel that the media presentation device is receiving media content on; and
   taking action based on the determined channel.

2. The method of claim 1, wherein the computing system is an entity other than the media presentation device, and wherein the digital fingerprint data is generated by the media presentation device, the method further comprising:
   receiving by the computing system, from the media presentation device, the digital fingerprint data generated by the media presentation device.

3. The method of claim 1, wherein the multiple instances of reference fingerprint data are selected from a plurality of instances of reference fingerprint data, and wherein detecting that the digital fingerprint data representing the media content being rendered by the media presentation device matches the multiple instances of reference fingerprint data comprises:
comparing the digital fingerprint data representing the media content being rendered by the media presentation device with the plurality of instance reference fingerprint data; and
based on the comparing, determining that the digital fingerprint data representing the media content being rendered by the media presentation device matches the multiple instances of reference fingerprint data.

4. The method of claim 3, further comprising detecting and flagging a multi-match group comprising the multiple instances of reference fingerprint data, wherein determining that the digital fingerprint data representing the media content being rendered by the media presentation device matches the multiple instances of reference fingerprint data comprises determining that the digital fingerprint data matches the instances of reference fingerprint data of the flagged multi-match group.

5. The method of claim 1, further comprising:
making a determination that the location of the media presentation device matches the location associated with the particular instance of reference fingerprint data.

6. The method of claim 5, further comprising determining the location of the media presentation device, to facilitate making the determination that the location of the media presentation device matches the location associated with the particular instance of reference fingerprint data.

7. The method of claim 6, wherein determining the location of the media presentation device is based on identification of location-distinguishing content being rendered by the media presentation device.

8. The method of claim 7, wherein the location-distinguishing content comprises a local commercial or local news program, and wherein determining the location of the media presentation device based on the location-distinguishing content comprises:
determining a location associated with the local commercial or local news program; and
based on the determined location associated with the local commercial or local news program, determining that the location of the media presentation device is the location associated with the local commercial or local news program.

9. The method of claim 1, wherein performing disambiguation based at least in part on the location of the media presentation device comprises performing the disambiguation based at least in part on the location of the media presentation device and based at least in part on an identity of a distributor of the media content being rendered by the media presentation device.

10. The method of claim 1, wherein performing disambiguation based at least in part on the location of the media presentation device comprises:
detecting that the particular instance of reference fingerprint data of the multiple instances of reference fingerprint data represents location-specific content and that the digital fingerprint data representing media content being rendered by the media presentation device also represents the location-specific content; and
based at least on the detecting that the particular instance of reference fingerprint data of the multiple instances of reference fingerprint data represents location-specific content and that the digital fingerprint data representing media content being rendered by the media presentation device also represents the location-specific content, concluding that the channel corresponding with the particular instance of reference fingerprint data is the channel being rendered by the media presentation device.

11. The method of claim 1, wherein taking action based on the determined channel comprises causing supplemental channel-specific content to be presented in conjunction with the media content being rendered by the media presentation device.

12. The method of claim 1, wherein taking action based on the determined channel comprises causing an advertisement to replace a predetermined portion of the media content being rendered by the media presentation device.

13. A media presentation device comprising:
a media input interface through which to receive media content to be presented by the media presentation device;
a media presentation interface for presenting the received media content;
a network communication interface;
a processing unit;
non-transitory data storage; and
program instructions stored in the non-transitory data storage and executable by the processing unit to cause the media presentation device to carry out operations including:
generating digital fingerprint data of the media content based on analysis of the media content, and outputting the generated digital fingerprint data for transmission through the network communication interface to a server,
providing the server with an indication of a location of the media presentation device, wherein providing the server with the indication of the location of the media presentation device enables the server to use the location of the media presentation device as a basis to determine a channel on which the media presentation device is receiving the media content when the server determines that the digital fingerprint data matches reference fingerprint data corresponding respectively with each of multiple different channels, wherein using the location of the media presentation device as a basis to determine the channel on which the media presentation device is receiving the media content includes, based at least in part on a match between the location of the media presentation device and a location associated with a particular one of the multiple channels with which the reference fingerprint data corresponds, determining that the particular channel is the channel on which the media presentation device is receiving the media content,
receiving supplemental media content based on the channel that the server determined, and
presenting the received supplemental media content in conjunction with the media content being presented by the media presentation device.

14. The media presentation device of claim 13, wherein outputting the generated digital fingerprint data for transmission through the network communication interface to the server comprises outputting a communication providing the generated digital fingerprint data, and wherein providing the server with the indication of the location of the media presentation device comprises providing the indication in the communication.

15. The media presentation device of claim 13, wherein the supplemental channel-specific content comprises at least one of a pop-up advertisement, a commercial break, or a channel-identification.

16. The media presentation device of claim 13,
wherein the supplemental media content comprises an advertisement, and
wherein presenting the supplemental media content in conjunction with the media content being presented by the media presentation device comprises presenting the advertisement as a replacement for a portion of the media content being presented by the media presentation device.

17. A method comprising:
generating, by a media presentation device, digital fingerprint data of media content being received and presented by the media presentation device, wherein generating the digital fingerprint data is based on analysis of the media content being received and presented;
transmitting, by the media presentation device, the generated digital fingerprint data to a server; and
providing, by the media presentation device, the server with an indication of a location of the media presentation device, wherein providing the server with the indication of the location of the media presentation device enables the server to use the location of the media presentation device as a basis to determine a channel on which the media presentation device is receiving the media content when the server determines that the digital fingerprint data matches reference fingerprint data corresponding respectively with each of multiple different channels, wherein using the location of the media presentation device as a basis to determine the channel on which the media presentation device is receiving the media content includes, based at least in part on a match between the location of the media presentation device and a location associated with a particular one of the multiple channels with which the reference fingerprint data corresponds, determining that the particular channel is the channel on which the media presentation device is receiving the media content,
receiving, by the media presentation device, supplemental media content based on the channel that the server determined, and
presenting, by the media presentation device, the received supplemental media content in conjunction with the media content being presented by the media presentation device.

18. The method of claim 17, wherein transmitting the generated digital fingerprint data to the server comprises transmitting to the server a communication providing the generated digital fingerprint data, and wherein providing the server with the indication of the location of the media presentation device comprises providing the indication in the communication.

19. The method of claim 17, wherein the supplemental channel-specific content comprises at least one of a pop-up advertisement, a commercial break, or a channel-identification.

20. The method of claim 17,
wherein the supplemental media content comprises an advertisement, and
wherein presenting the supplemental media content in conjunction with the media content being presented by the media presentation device comprises presenting the advertisement as a replacement for a portion of the media content being presented by the media presentation device.

* * * * *